United States Patent [19]

Hollenberg

[11] Patent Number: 4,554,020

[45] Date of Patent: Nov. 19, 1985

[54] HYDRAULIC CEMENT ADMIXTURE COMPOSITIONS

[75] Inventor: David H. Hollenberg, Neenah, Wis.

[73] Assignee: W. R. Grace & Co., Cambridge, Mass.

[21] Appl. No.: 595,066

[22] Filed: Mar. 29, 1984

[51] Int. Cl.$^4$ .............................................. C04B 7/35
[52] U.S. Cl. ........................................ 106/90; 106/314; 106/315; 260/462 R
[58] Field of Search ........................... 106/90, 314, 315

[56] References Cited

U.S. PATENT DOCUMENTS

| | | | |
|---|---|---|---|
| 3,053,674 | 9/1962 | Liberthson et al. | 106/90 |
| 3,748,159 | 7/1973 | George | 106/90 |
| 3,856,541 | 12/1974 | Martin | 106/90 |
| 3,976,494 | 8/1976 | Kudo et al. | 106/14 |
| 4,137,093 | 1/1979 | Poblano | 106/315 |
| 4,190,454 | 2/1980 | Yamagisi et al. | 106/90 |
| 4,210,455 | 2/1980 | Metcalf et al. | 106/315 |

OTHER PUBLICATIONS

Publication of J. Borseken entitled The Use of Boric Acid for the Determination of Configuration of Carbohydrates, Advances in Carbohydrate Chemistry, 4, 187–210 (1949).

*Primary Examiner*—William R. Dixon, Jr.
*Assistant Examiner*—Ann M. Knab
*Attorney, Agent, or Firm*—John J. Wasatonic; William L. Baker

[57] ABSTRACT

Admixture compositions for hydraulic cement compositions are disclosed which comprise a borate ester of a polyhydroxy compound. The admixtures are effective water-reducing agents at relatively low dosages in hydraulic cements. They generally provide water reduction levels equal to or greater than those provided by the corresponding non-esterified polyhydroxy compound with a lesser degree of set retardation.

14 Claims, No Drawings

4,554,020

HYDRAULIC CEMENT ADMIXTURE COMPOSITIONS

BACKGROUND OF THE INVENTION

This invention is directed to admixtures for hydraulic cement compositions and more particularly to water-reducing admixtures capable of increasing the slump of hydraulic cement compositions without excessive retardation of the cement setting time.

Various water-reducing admixtures for hydraulic cement compositions are known. These admixtures are capable of modifying cement slurry compositions to permit the use of lesser amounts of water to achieve a desired plasticity or workability. Alternatively, these admixtures can be used to provide increased plasticity or workability, as compared to a cement composition without the admixture added, at the same water/cement ratio. The admixtures also provide higher compressive strength in the cement composition after setting, due either to the use of less water in the mix or to a more complete dispersion of the cement particles in the plastic cement mix.

Lignosulfonic acid salts and salts of aromatic sulfonic acid-aldehyde condensate polymers are well known water-reducing agents. In general relatively high dosages of these water-reducing agents are necessary in order to obtain significant water-reduction. However, such dosages generally enhance the rate of slump loss and tend to excessively retard or prevent setting.

Various polyhydroxy compounds, such as glucose, gluconic acid salts, glucoheptonic acid salts, and various polysaccharidic materials, have also been proposed for use as water-reducing agents. However, these materials generally suffer from the disadvantage of imparting unacceptably high levels of set retardation to the cement composition with an accompanying reduction in strength gain.

There is accordingly a continuing desire in the art to develop new water-reducing admixture compositions which can provide a high degree of fluidity to hydraulic cement compositions without undue adverse effect on the cement setting time.

SUMMARY OF THE INVENTION

The present invention is directed to cement admixture compositions which are capable of providing significant water reduction in hydraulic cement compositions without excessive increases in set retardation. These admixtures are effective water-reducing agents at relatively low dosages in hydraulic cements and the ability to utilize these materials at such low dosage levels provides substantial control in minimizing the set retardation associated with use of the admixtures.

The present invention is accordingly directed to admixture compositions which comprise a borate ester of a polyhydroxy compound. The borate ester is generally prepared by reaction of boric acid with an esterifying polyhydroxy compound or salt thereof. It has been found that, in general, the esterification or complexation of the polyhydroxy compound with the boron moiety substantially reduces the set retardation associated with the use of the polyhydroxy compound alone i.e., not esterified, in a hydraulic cement mix, while providing a level of water-reduction which compares favorably with that obtained using the polyhydroxy compound alone.

Preferred water-reducing agents of the present invention, which can provide especially favorably early compressive strengths in the set cement product, are the amine salts of the borate esters. These amine salts may also provide less retardation than that provided by the corresponding ester either existing in its free acid form or neutralized with a metal cation.

The present invention is further directed to hydraulic cement compositions comprising a borate ester of a polyhydroxy compound.

DETAILED DESCRIPTION OF THE INVENTION

As used herein, the term "hydraulic cement composition" is intended to refer to any composition containing a hydraulic cement binder, e.g., an ASTM Type I, II, III, IV, or V Portland cement, inclusive of both dry cement compositions and wet cement slurries or pastes. Included within the term are concretes, grouts, mortars, cement pastes, and the like. While the admixtures of this invention can provide water reduction in any such hydraulic cement composition, they have been found to be particularly well suited for use in Portland cement concretes.

The borate esters present in the admixtures of this invention can provide significant water reduction in hydraulic cement compositions when used at a relatively low dosage. Thus, for example, when added to Portland cement concretes in an amount of about 0.01% to 0.15% by weight, based on the weight of Portland cement binder in the concrete, the borate esters can provide effective water reduction, generally at a level which is sufficient to meet ASTM C494 standards as a Type D water-reducing agent. These water reduction levels are approximately equal to or greater than those provided by an equivalent amount of the non-esterified polyhydroxy compound added to the same concrete. However, the retardation associated with the use of the borate ester is generally significantly less than that associated with use of an equivalent amount of the non-esterified polyhydroxy compound.

The borate esters present in the admixtures of this invention are cyclic esters which are believed to involve complexation or bonding of a boron moiety to two hydroxyl groups within an esterifying polyhydroxy compound so as to form a cyclic structure. The borate esters generally used herein are believed to be mono-esters involving the complexation or bonding of one molecule of esterifying compound to one boron moiety, with the third valence position of the boron moiety occupied by a hydroxy group. However, although the mono-ester is believed to be the species generally used herein, the present invention broadly contemplates the employment of bis esters, involving complexation or bonding of two polyhydroxy compounds to one boron moiety. The hydroxy group of the mono-esters of this invention can be neutralized with a cation, as discussed hereinafter.

As used herein, the term "polyhydroxy compound" refers to diols and polyhydric compounds, i.e., compounds containing more than two hydroxy groups. The polyhydroxy compound can be an aromatic compound, such as a catechol, or an aliphatic compound, with the latter being preferred from the standpoint of attaining lower levels of set retardation. The aliphatic polyhydroxy compound can be an aliphatic diol such as ethylene glycol, 1,2-propanediol, or 1,3-propanediol; an aliphatic polyhydric alcohol such as glycerol, glucose, or mannose; an aliphatic diol carboxylic acid such as 2,3-dihydroxypropionic acid or tartaric acid; or, most preferably, an aliphatic polyhydric carboxylic acid such as a glucaric acid. Particularly preferred aliphatic polyhydric carboxylic acids are the glyconic acids, with gluconic acid and glucoheptonic acid being especially preferred. The stereospecificity of the polyhydroxy esterifying compound must, of course, be such as to permit formation of the cyclic borate ester. The stereospecific molecular requirements relating to borate ester formation are well known. An early study of this subject is provided by J. Boeseken, Advances in Carbohydrate Chemistry, 4, 189-210 (1949).

The borate esters of the invention can be prepared by known methods. Thus, boric acid can be reacted with the esterifying compound in an aqueous medium, using mild heating to facilitate completion of the reaction. Where the esterifying compound is not readily reactive with boric acid, it may prove desirable to employ in anhydrous polar reaction solvent, e.g., tetrahydrofuran, or higher reaction temperatures in order to promote ester formation. An esterifying polyhydroxy carboxylic acid may be reacted in its free acidic form, e.g., gluconic acid can be reacted with boric acid to provide an ester, or it may be reacted in its salt form, e.g., calcium gluconate may be reacted with boric acid to provide the correspondingly neutralized calcium borogluconate. A precursor to the carboxylic acid esterifying compound, e.g., a precursor lactone, may also be utilized as an esterifying reagent.

After formation of the ester, a base may be added to the reaction solution to neutralize the ester or as desired for cation exchange. However, the pH of the solution should be maintained at less than pH 10-11, and preferably less than about pH 8, in order to provide a stable solution which can be stored for extended periods.

Preparation of the mono-ester is normally facilitated by reacting approximately equimolar amounts of boron and the esterifying compound. However, the monoester may also be prepared using a molar excess of the esterifying compound, as may prove necessary where stereospecific or steric factors hamper the reaction of the esterifying compound with the boron moiety. Conversely, where the esterifying compound is readily reacted with the boron moiety, bis esters may be formed using a molar excess of the esterifying compound and, as aforementioned, the present invention broadly contemplates the use of bis borate esters as well.

The borate esters may be prepared and used in the free acid form, i.e. with an —OH group on the boron and —COOH group on an esterifying carboxylic acid compound. However, the salt form of the ester can provide less set retardation in concrete formulations and is thus generally preferred for use herein. Where the esterifying polyhydroxy compound is a polyhydroxy alcohol, the salt form incorporates a cation which displaces the hydrogen of the remaining hydroxyl group on the boron moiety. Where the esterifying polyhydroxy compound is a polyhydroxy carboxylic acid, the salt form incorporates a cation associated with the carboxyl group(s) of the esterifying compound and, optionally, a cation which displaces the hydrogen of the remaining hydroxyl group on the boron moiety. The cation can be an alkali metal, e.g., sodium or potassium, or an alkaline earth metal, e.g., calcium or magnesium.

Preferably, the cation is an amine cation such as ammonium, alkylammonium, or, most preferably, alkanolammonium. The preferred amine borate ester salts may provide superior performance in terms of reduced set retardation and increased compressive strengths as compared to the same borate ester neutralized with an alkali metal or alkaline earth metal chain. A particularly preferred borate ester salt of the invention comprises a mixture of alkanolamines as a cationic grouping, and more particularly a mixture of diethanolammonium and triethanolammonium cations. Monoethanolammonium cation can also be included in this mixture.

The admixtures of this invention can be added to hydraulic cement compositions in any amount which is suitable to provide a desired combination of water reduction or fluidification and set retardation. Generally, the admixture will be added at a concentration level which provides maximal water reduction (or fluidification) while maintaining the setting time of the cement at an acceptably low level.

As previously mentioned, the admixtures of this invention can be used as low range water-reducing agents by addition to Portland cement concretes in an amount of about 0.01% to 0.15% by weight of the borate ester, based on the weight of Portland cement binder. At these dosage levels, the initial setting time of the concrete is normally retarded about ½ hour to 2½ hours as compared to the initial setting time of the same concrete without the admixture added. The early compressive strengths of the concretes containing the admixture at these dosage levels, e.g., 1 day and 7 day strengths as determined in accordance with ASTM C192, generally equal or exceed those of the same concrete without the admixture present.

Although it is generally preferred to use the admixture in an amount within the above stated range of 0.01% to 0.15% by weight, so as to provide desired water reduction and compressive strengths with minimal set retardation, for some applications, such as hot water applications, a greater degree of set retardation may be desired and a higher admixture amount can be used to meet this requirement.

It should be appreciated that the effect of the present admixtures in hydraulic cement compositions can vary as a function of the type of hydraulic cement binder, the water/cement ratio, use of additional admixture materials, aggregate size and amount, and other variable factors which commonly enter into the formulation and curing of such compositions. However, these variable factors are well known in the art and the performance of the present admixtures as a function of these variables can be determined using standard empirical test methods.

The admixture compositions of this invention may be provided in dry powder form, generally by simple evaporation of the reaction solvent used in preparation of the borate ester. Preferably, for purposes of facilitating addition to hydraulic cement compositions the admixture is provided in aqueous solution, i.e., the borate ester is dissolved in an aqueous-based solvent. The admixture solution can be prepared at any suitable concentration, either by re-dissolving a dry powder form of the borate ester or by adjustment as necessary of the reaction solution product obtained in preparation of the borate ester. As a general rule, admixture solutions containing about 10% to about 70% by weight of the borate ester are used in this invention. The admixture solution should have a pH of less than about pH 10 or 11, and more preferably less than about pH 8, in order to provide a stable solution which can be stored for extended periods.

The admixture may be added to a dry hydraulic cement mixture or to a wet cement slurry. In general, the admixture will be added in its dry powder form to a dry cement mix while an aqueous solution of the admixture is used in the case of addition to a wet cement slurry. While the admixture may be dissolved in the mix water used to prepare the cement slurry, it preferably is added as a separate solution following preparation of the slurry. After addition, sufficient mixing should be provided to assure a substantially uniform distribution of the admixture throughout the cement composition.

Consistent with the foregoing, the present invention is further directed toward hydraulic cement compositions comprising a hydraulic cement binder and a borate ester of a polyhydroxy compound. The total amount of the borate ester in the cement composition is generally about 0.01% to 0.15% by weight, based on the weight of hydraulic cement binder, although it may be present in greater amounts where the resultant increase in set retardation can be tolerated. The cement composition can be in an essentially dry, free-flowing powder form or a wet slurry form. The preferred hydraulic cement compositions of the invention comprise a Portland cement binder. Fine or course aggregate or additional admixtures may be present in the inventive cement compositions.

The following examples are given to further describe and illustrate the present invention. The following Examples are illustrative only and are not intended to limit the present invention in any sense. All parts and percentages are by weight unless otherwise indicated.

EXAMPLE 1

Preparation of calcium borogluconate solution 860.5 grams of calcium gluconate monohydrate and 244 grams of technical grade boric acid were added to 1100 grams of water at room temperature. The resultant mixture was stirred and warmed to a temperature of about 50° C. until a dark brown solution was obtained. The solution was allowed to cool to room temperature. The solution can be used as is or the water can be evaporated to provide the calcium borogluconate as a brownish solid.

EXAMPLE 2

Preparation of calcium borogluconate solution 28 grams of calcium oxide were added to water to form a thick slurry. This slurry was slowly added with stirring to 392 grams of a 50% aqueous solution of technical grade gluconic acid. After all of the slurry was added the resultant mixture was cooled and 61.8 grams of technical grade boric acid added. The mixture was stirred until a dark brown solution was obtained and then adjusted by water addition to provide a 40% solids solution.

EXAMPLE 3

Preparation of sodium boroglucoheptonate solution 123.7 grams of technical grade boric acid were added slowly to 1417 grams of a 35% aqueous solution of technical grade sodium glucoheptonate. The mixture was stirred at room temperature until a dark brown solution was obtained.

EXAMPLE 4

Preparation of triethanolammonium borogluconate solution 35.6 grams of gluconolactone and 12.2 grams of technical grade boric acid were added to 50 ml. of water at room temperature. The resultant mixture was stirred and heated at about 50° C. for about 4 hours and the water allowed to evaporate to reduce the mixture volume to about 45 ml. The mixture was then cooled to room temperature and 28 grams of triethanolamine were added with stirring.

EXAMPLE 5

2584 grams of a 35% solids aqueous solution of technical grade sodium glucoheptonate were adjusted to about pH 6 by addition of 20.5 grams of an 88% formic acid solution. 226 grams of technical grade boric acid were then added to the pH adjusted solution and the resultant mixture stirred overnight at room temperature. 476 grams of a mixture of monoethanolamine, diethanolamine, and triethanolamine were then added with stirring, bringing the pH of the resultant solution to pH 8. The alkanol amine mixture was reported by the supplier to contain 0–15% monoethanolamine, 13–45% diethanolamine, 55–76% triethanolamine, and 0–5% of other materials.

The borate ester prepared in this example is believed to comprise a mixture of both the sodium and mixed alkanolamine salts of the boroglucoheptonate ester.

EXAMPLE 6

Preparation of mixed alkanolamine borogluconate solution 500 grams of gluconolactone and 173.6 grams of technical grade boric acid were added to 500 ml. of water and the resultant mixture stirred and warmed until a dark brown solution was obtained. The solution was cooled to room temperature and 418 grams of the alkanolamine mixture of Example 5 were added with cooling. The resultant solution was diluted with water to a total weight of 1980.4 grams to provide a 50% solids solution of the mixed alkanolamine borogluconate.

EXAMPLE 7

A 69% by weight aqueous solution of the alkanolamine borogluconate of Example 6 was added to two concretes containing different Type I Portland cement binders, respectively designated Concretes I and II. The mixed alkanol amine borogluconate was added with the mix water in an amount of about 0.07% by weight, based on the weight of Portland cement binder.

Also added to separate batches of Concretes I and II was a 58.7% aqueous solution of a non-neutralized borogluconate ester prepared by reaction of approximately equimolar amounts of gluconolactone and technical grade boric acid in water at ambient temperature. The non-neutralized borogluconate was added with the mix water in an amount of about 0.044% by weight, based on the weight of the Portland cement binder.

The above respective weight concentrations of 0.07% and 0.044% provided approximately equivalent molar amounts of the mixed alkanolamine borogluconate and non-neutralized borogluconate in the concretes. For purposes of calculating this molar quantity, the mixed alkanolamine borogluconate was assumed to be neutralized with a 50:50 mixture of diethanolamine and triethanolamine so as to arrive at an assumed molecular weight of 351. The amount of mixed alkanolamine borogluconate used in this Example (5.98 grams of the mixed alkanolamine borogluconate were added to concrete containing about 8600 grams of Portland cement binder) was thus assumed to be 0.017 moles.

Each of the above concretes was prepared at a water/cement ratio of 0.58 and with a cement factor of 517 lbs./yd.

Slump measurements of the resultant concrete slurries were made at about 9 minutes after addition of the admixtures in accordance with ASTM C143. The concretes were also measured for air content (ASTM C231), initial and final setting times (ASTM C403), and compressive strength (ASTM) C192) at 1, 7, and 28 days (average of two cylinders).

The above concretes were compared against batches of the same concretes without any admixture added and against batches of the same concretes to which were added about 0.017 moles of, respectively, boric acid, gluconic acid, the alkanolamine mixture used to prepare the mixed alkanolamine borogluconate, this being the same alkanolamine mixture as described in Example 5 but assumed to be a 50:50 mixture of diethanolamine and triethanolamine, and boric acid and gluconic acid (0.017 moles of each) added separately to the same concrete. Slump, air content, initial and final setting times, and compressive strengths of the comparative concretes were measured as above. The results of all measurements made on the various Concretes I and II are presented in Tables I and II, respectively.

As shown in Tables I and II, the mixed alkanolamine borogluconate admixture provided the best combination of slump and set retardation in both Concretes I and II. Significant increases in slump over the concretes containing no admixture were observed, with initial and final setting time increases of 2:24 and 2:26, respectively, in Concrete I and 1:08 and 1:17, respectfully, in Concrete II. The mixed alkanolamine borogluconate containing samples exhibited less set retardation than the concretes containing either the gluconic acid alone or the boric acid and gluconic acid mixture, while providing slump increases approximately equal to or greater than those provided in these comparative concretes. While the boric acid and mixed alkanolamine samples had lower setting times than the mixed alkanolamine borogluconate samples, the borogluconate samples exhibited higher slumps, with this tendency being more pronounced in Concrete I.

The non-neutralized borogluconate also provided significant increases in slump over the concretes containing no admixture, with initial and final setting time increases of 2:35 and 2:52, respectively, in Concrete I and 1:22 and 1:39, respectively, in Concrete II. The set retardation provided by the non-neutralized borogluconate was greater than that provided by the mixed alkanolamine borogluconate or gluconic acid, but was less than that provided by an equivalent molar amount of gluconic acid alone.

What is claimed is:

1. A hydraulic cement composition comprising a hydraulic cement binder and an amine salt of a borate ester of a polyhydroxy compound.

2. A composition of claim 1 wherein said hydraulic cement binder is Portland cement.

3. A composition of claim 1 wherein the amount of said borate ester is about 0.01% to 0.15%, based on the weight of said hydraulic cement binder.

TABLE I

| Concrete | Admixture | Air % | Slump (in.) | Initial Setting Time (hr:min) | Final Setting Time (hr:min) | Compressive Strength | | |
|---|---|---|---|---|---|---|---|---|
| | | | | | | 1 day | 7 day | 28 day |
| I | None | 1.8 | 3.75 | 4:49 | 6:29 | 1215 | 4179 | 5549 |
| I | Boric Acid | 1.7 | 5.50 | 5:05 | 6:39 | 1225 | 4199 | 6010 |
| I | Gluconic Acid | 1.7 | 7.00 | 8:00 | 9:39 | 1004 | 4309 | 6249 |
| I | Boric Acid Gluconic Acid | 2.0 | 4.25 | 6:42 | 8:27 | 1064 | 4622 | 5903 |
| I | Alkanolamine Mixture | 2.3 | 4.50 | 5:11 | 6:39 | 1512 | 4695 | 6254 |
| I | Mixed alkanolamine Borogluconate | 2.2 | 7.50 | 7:12 | 8:45 | 1272 | 4615 | 6472 |
| I | Non-neutralized Borogluconate | 1.7 | 6.50 | 7:24 | 9:21 | 1053 | 4480 | 6043 |

TABLE II

| Concrete | Admixture | Air % | Slump (in.) | Initial Setting Time (hr:min) | Final Setting Time (hr:min) | Compressive Strength | | |
|---|---|---|---|---|---|---|---|---|
| | | | | | | 1 day | 7 day | 28 day |
| II | None | 1.8 | 4.50 | 4:01 | 5:12 | 1742 | 4193 | 6191 |
| II | Boric Acid | 1.8 | 5.00 | 4:09 | 5:19 | 1593 | 3926 | 5727 |
| II | Gluconic Acid | 1.8 | 5.25 | 5:50 | 7:23 | 1612 | 4416 | 6448 |
| II | Boric Acid Gluconic Acid | 1.9 | 4.25 | 5:17 | 6:42 | 1644 | 4115 | 5970 |
| II | Alkanolamine Mixture | 1.9 | 4.50 | 4:01 | 5:15 | 1843 | 4700 | 6364 |
| II | Mixed Alkanolamine Borogluconate | 2.0 | 5.25 | 5:09 | 6:30 | 1699 | 4738 | 5903 |
| II | Non-neutralized Borogluconate | 1.4 | 5.25 | 5:22 | 6:52 | 1661 | 4076 | 6139 |

4. A composition of claim 1 wherein said polyhydroxy compound is an aliphatic diol, an aliphatic polyhydric alcohol, an aliphatic diol carboxylic acid, or an aliphatic polyhydric carboxylic acid.

5. A composition of claim 4 wherein said polyhydroxy compound is a glyconic acid.

6. A composition of claim 5 wherein said glyconic acid is gluconic acid or glucoheptonic acid.

7. A composition of claim 1 wherein said amine salt is selected from the group consisting of ammonium salts, alkylammonium salts, and alkanolammonium salts.

8. A composition of claim 1 wherein said amine salt of a borate ester comprises a mixture of alkanolammonium cations.

9. A composition of claim 8 wherein said mixture of alkanolammonium cations comprises diethanolammonium and triethanolammonium cations.

10. A Portland cement concrete composition comprising a Portland cement binder and from about 0.01% to 0.15% by weight, based on the weight of said binder, of an alkanolammonium salt of a borate ester of an aliphatic polyhydroxy compound.

11. A composition of claim 10 comprising a mixture of a diethanolammonium salt of a borate ester and a triethanolammonium salt of a borate ester.

12. A composition of claim 10 wherein said polyhydroxy compound is a polyhydric carboxylic acid.

13. A composition of claim 12 wherein said polyhydric carboxylic acid is a glyconic acid.

14. A composition of claim 13 wherein said glyconic acid is gluconic acid or glucoheptonic acid.

* * * * *